US008818415B2

(12) United States Patent
Horvitz et al.

(10) Patent No.: US 8,818,415 B2
(45) Date of Patent: *Aug. 26, 2014

(54) COMMERCIALLY SUBSIDIZED MOBILE COMMUNICATION DEVICES AND SERVICES

(71) Applicant: Microsoft Corporation, Redmond, WA (US)

(72) Inventors: Eric Horvitz, Kirkland, WA (US); Xuedong Huang, Bellevue, WA (US); Kamal Jain, Bellevue, WA (US); Milind Vasudeo Mahajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,997

(22) Filed: Dec. 6, 2012

(65) Prior Publication Data

US 2013/0097022 A1    Apr. 18, 2013

Related U.S. Application Data

(63) Continuation of application No. 12/701,539, filed on Feb. 6, 2010, now Pat. No. 8,340,689.

(51) Int. Cl.
  *H04W 24/00*    (2009.01)
(52) U.S. Cl.
  USPC ...................................................... 455/456.3
(58) Field of Classification Search
  USPC ...................................................... 455/456.3
  See application file for complete search history.

(56) References Cited

U.S. PATENT DOCUMENTS

| 2003/0220835 | A1 | 11/2003 | Barnes, Jr. |
| 2004/0024632 | A1 | 2/2004 | Perry |
| 2004/0199430 | A1 | 10/2004 | Hsieh |
| 2005/0149388 | A1 | 7/2005 | Scholl |
| 2007/0077944 | A1 | 4/2007 | Bellenger et al. |
| 2008/0034088 | A1 | 2/2008 | Suresh |

(Continued)

OTHER PUBLICATIONS

Kolmel, et al.; "Location Based Advertising", M-Business 2002 The First International Conference on Mobile Business, http://www.e-lba.com/YellowMap_Location%20Based%20Advertising%20mBusiness%20Conference%202002.pdf Dated: 2002 pp. 1-7.
Ververidis et al., "Mobile Marketing Using a Location Based Service", in Proceedings of the First International Conference on Mobile Business, Athens, Greece, Jul. 2002 http://mm.aueb.gr/publications/2002-Mobile-M-Business.pdf pp. 1-11.

(Continued)

*Primary Examiner* — Nathan Mitchell
(74) *Attorney, Agent, or Firm* — Dan Choi; Carole Boelitz; Micky Minhas

(57) ABSTRACT

Mobile communication devices, such as mobile phones, may be capable of recommending to a user various providers of one or more solicited services, e.g., by identifying a user location and identifying providers near the user location that provide the services, and by initiating a call between the user and a selected provider. However, the equipment and service costs of such devices may be prohibitive, particularly for mid-range mobile communication devices that may appeal to cost-conscious users. The prohibitive costs may be diminished by redirecting part or all of the cost of providing the recommendation service from the providers, e.g., by charging the provider a service cost upon initiating a call from the user to the provider, or upon representing the provider in a provider database. In one such embodiment, all service costs may be borne by providers, providing to the user a free recommendation service via the mobile communication device.

20 Claims, 7 Drawing Sheets

(56) References Cited

U.S. PATENT DOCUMENTS

| | | |
|---|---|---|
| 2008/0039049 A1 | 2/2008 | Park |
| 2008/0065507 A1 | 3/2008 | Morrison et al. |
| 2008/0153465 A1* | 6/2008 | Evermann et al. ......... 455/414.1 |
| 2008/0194260 A1 | 8/2008 | Altberg et al. |
| 2008/0228758 A1 | 9/2008 | Aaltonen et al. |
| 2008/0281687 A1 | 11/2008 | Hurwitz et al. |
| 2008/0287096 A1 | 11/2008 | Aaltonen et al. |
| 2008/0287113 A1 | 11/2008 | Aaltonen et al. |
| 2008/0288457 A1 | 11/2008 | Aaltonen et al. |
| 2008/0288642 A1 | 11/2008 | Aaltonen et al. |
| 2008/0288881 A1 | 11/2008 | Aaltonen et al. |
| 2009/0017805 A1 | 1/2009 | Sarukkai et al. |
| 2010/0191575 A1 | 7/2010 | Raleigh |
| 2010/0312619 A1 | 12/2010 | Ala-Pietile et al. |
| 2011/0195726 A1 | 8/2011 | Horvitz et al. |

OTHER PUBLICATIONS

"Mobile Marketing", pp. 1-4, http://en.wikipedia.org/wiki/Mobile_Marketing#User-controlled_media Dated: May 18, 2009 pp. 1-4.

Non Final Office Action cited in Related U.S. Appl. No. 12/701,539 Dated: Sep. 1, 2011 pp. 1-20.

Amendment cited in Related U.S. Appl. No. 12/701,539 Dated: Jan. 3, 2012 pp. 1-19.

Office Action cited in Related U.S. Appl. No. 12/701,539 Dated: Mar. 13, 2012 pp. 1-9.

Response to Office Action cited in Related U.S. Appl. No. 12/701,539 Dated: May 14, 2012 pp. 1-13.

Notice of Allowance cited in Related U.S. Appl. No. 12/701,539 Dated: Aug. 24, 2012 pp. 1-10.

* cited by examiner

COMMERCIALLY SUBSIDIZED MOBILE COMMUNICATION DEVICES AND SERVICES

RELATED APPLICATION

This application is a continuation of U.S. patent application Ser. No. 12/701,539, filed on Feb. 6, 2010 entitled "COMMERCIALLY SUBSIDIZED MOBILE COMMUNICATION DEVICES AND SERVICES," the entirety of which is incorporated by reference herein.

BACKGROUND

In the field of mobile computing, a mobile device may be capable of providing recommendations for local services. For example, a global positioning system (GPS) device may be configured to receive a query from a user for a particular type of service, such as a particular type of food or the sale of fuel, and to display the names and locations of nearby providers of such services. Similarly, a cellphone phone may permit users to call an information line and receive recommendations for a particular type of service in a specified city and to contact the providers, e.g., to inquire about the provided services and the hours of operation. A GPS-equipped cellphone device may provide both such capabilities by locating the current position of the user, displaying nearby providers of selected services, and allowing the user to contact the providers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While mobile communication devices may be configured both to locate nearby providers of a desired service and to contact the providers, the provision of such services to the user may be costly. As a first example, such capabilities may entail comparatively sophisticated hardware and software, including a GPS receiver or other geolocation device, mapping hardware or software, a high-quality display that may render useful maps, and cellular communications hardware. Moreover, the user may wish to communicate with providers of such services in other ways, such as by visiting the websites of the providers, and the mobile communication device may comprise a robust processor, a significant amount of higher-performance memory, Internet communications infrastructure (e.g., a TCP/IP protocol stack), a general-purpose web browser, and various input mechanisms (e.g., a hardware keyboard or a touchscreen coupled with a software keyboard.) This equipment may result in a higher cost of the mobile communication device that is too expensive for some users. As a second example, such capabilities involve comparatively high service charges; e.g., communications with providers of the solicited services may be charged against a user's per-minute metered call plan for the duration of a call to a service provider or a per-kilobyte metered internet access plan for visiting the websites of various providers. This consumption of the user's metered data services may be too expensive for many users, thereby diminishing or preventing these users' participation in the provider search services. As a third example, the mobile communication device may not even have a general-purpose communication interface that is accessible to the user (or the costs associated therewith), but may be configured to communicate only with providers of a solicited service.

One technique that may be implemented to address these cost problems involves a subsidization of the search service by the potential providers of such services. For example, part or all of the costs of the mobile communication device may be subsidized by the providers of such services, and/or the charge of a metered data plan for a communication session established between a user and a provider of a solicited service may be partly or wholly charged to the provider instead of to the user. The mobile communication device may therefore be configured to support the charging of some portion of the service charge of the device to the providers of solicited services, thereby rendering the device and the search service more affordable for the users. This improved affordability may consequently promote the acquisition of such devices and the utilization of the service by more cost-conscious users. Moreover, the charges to a particular provider may be computed proportionally to the benefit of the utilized service to the provider, such as per impression (e.g., upon recommending a provider of a solicited service to a user) or per "click-through" (e.g., upon initiating a communication session between the user and the provider relating to the solicited service.) Alternatively, these techniques may be utilized in a mobile communication device (e.g., a GPS receiver) that does not have a data plan or a general-purpose communication interface, but that is capable of communicating with providers of solicited services.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
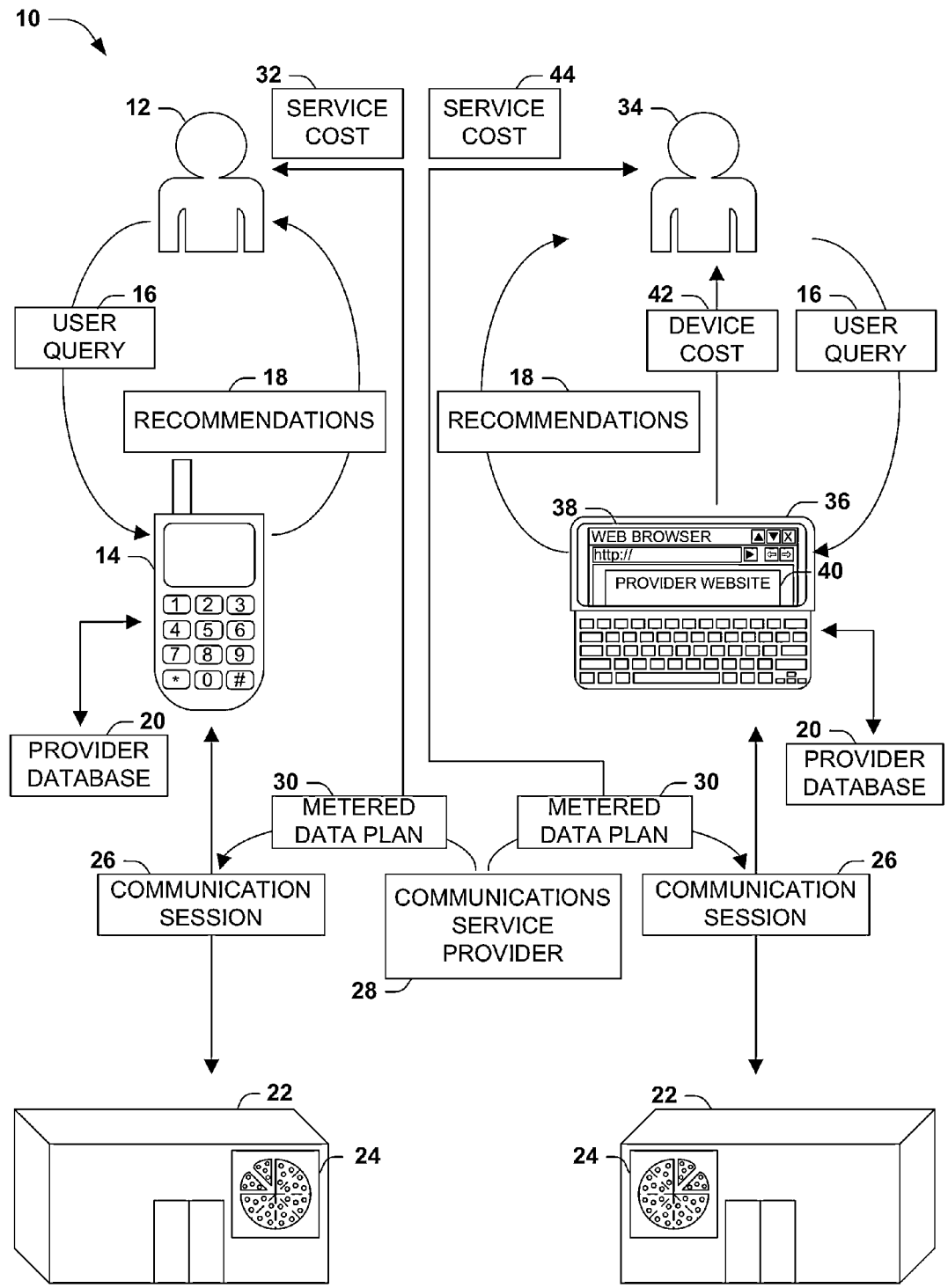
FIG. 1 is an illustration of an exemplary scenario featuring a connection of users with providers of a solicited service through mobile communication devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of mobile computing, many scenarios may involve a solicitation of a user of a mobile device for a service. For example, a user may request the locations of fuel depots, vehicle repair services, lodging, or restaurants serving a particular type of food. The user might enter such queries into a global positioning system (GPS) receiver, which may locate relevant providers of such services near the user, may display the locations of the providers on a map of the locale of the user, and may provide directions from the user location to a provider selected by the user. Alternatively, the user might enter such queries into a mobile phone, which may call a human or automated service (e.g., a 411 or information service) for a list of recommendations of providers of the desired service(s) within a desired location, and which may assist the user in calling a selected provider of such services (e.g., to inquire about the provided services, the costs thereof, or the hours of operation of the provider.) A hybrid mobile device might comprise both a mobile phone and a GPS receiver, and might assist the user both in locating nearby services and in contacting the recommended providers in order to negotiate the provision of the solicited services.

FIG. 1 illustrates an exemplary scenario 10 featuring two such mobile devices that may be utilized in this capacity. In this scenario, a first user 12 of a mobile communication device 14 (e.g., a cellphone) submits a user query 16 for providers 22 of a particular type of service 24, e.g., a request for recommendations of restaurants serving a particular type of food. The mobile communication device 14 may process the user query 16 against a provider database 20 (which may be partially or wholly locally accessible, such as a database stored in the memory of the mobile communication device 14, and/or partially or wholly remotely accessible, such as a database hosted on a server that the mobile communication device 14 may access) and may present to the user 12 a set of recommendations 18 of providers 22. The mobile communication device 14 may also be serviced by a communications service provider 28, e.g., a cellular phone company that provides mobile phone service. Often, such services are provided subject to a metered data plan 30, whereby the user 12 is permitted a particular allotment of data (e.g., a number of minutes that may be used in calls within a particular period.) Relying on the metered data plan 30, the first user 12 may then select a particular provider 22 and may use the mobile communication device 14 to initiate a communication session 26 with the provider 22 regarding the solicited service 24, e.g., a telephone call to the restaurant to place a food order. The communications service provider 28 may deduct the data usage of the communication session 26 from the metered data plan 30 (e.g., as a service cost 32 deducted from the service allotment of the user 12 within the metered data plan 30, or an overage charge that may be assessed against the user 12 for exceeding the service allotment of the metered data plan 30.)

The exemplary scenario 10 of FIG. 1 also illustrates a second user 34 who may similarly solicit services 24 from various providers 22 using a mobile communication device 36. However, this mobile communication device 36 may be configured to permit communication with providers 22 through a web interface, e.g., a web browser 38 through which may be viewed the provider websites 40 of various providers 22. In exchange for this enhanced capability, the second user 34 may pay a device cost 42 for the mobile communication device 36 (by contrast with the first user 12, who may pay little or no device cost for the simpler mobile communication device 14.) The second user 34 submits the user query 16 soliciting the service 24 to the mobile communication device 36, which processes the user query 16 against the provider database 20 and provides a set of recommendations 18 of various providers 22 that may be able to provide the service 24. Instead of calling a selected provider 22 as performed by the first user 12, the second user 34 may use the mobile communication device 36 to access the provider website 40 of the selected provider 22 in regard to the service 24 (e.g., in order to examine the menu of the restaurant or to place a food order online.) This accessing may be handled by the communications service provider 28, which may provide internet access (e.g., web service) to the mobile communication device 36 according to a metered data plan 30, such as a cap on the number of megabytes of data that may be transferred in browsing sessions within a particular period. Accordingly, the communications service provider 28 may receive the request to visit the provider website 40 and may initiate a communication session 26 (e.g., a browser session with access to the internet) between the second user 34 and the provider website 40 (which may, e.g., be hosted by a third party on behalf of the provider 22.) The second user 34 may therefore communicate with the service provider 22, and the data exchange involved in the communication session 26 may be deducted from the metered data plan 30 of the second user 34 (e.g., as a service charge 44 deducted from the service allotment of the second user 34, or as an overage charge to be assessed against the second user 34 for exceeding the service allotment of the metered data plan 30.) In this manner, the mobile communication devices facilitate the user 34 in selecting recommended providers 22 of solicited services 24.

These scenarios illustrate a few techniques for interfacing a user 12 with the providers 22 of various services 24 through a mobile communication device 14. However, these scenarios illustrate some drawbacks that may discourage or preclude more cost-conscious users 12 from participating in these scenarios. As a first example, the service cost 32 may deter users 12 who have metered data plans 30 with low data limits or who use a significant portion of their data limits within the designated period, and who may therefore decline to utilize the provider recommendation service in order to avoid service overage charges. As a second example, more sophisticated mobile communication device 14 may have a comparatively high device cost 42 to the user 12. While simpler mobile communication devices 14 might be provided by the communications service provider 28 at a free or reduced price, more sophisticated devices may be prohibitively expensive to acquire for cost-conscious users 12. For example, in order to provide internet access (in lieu of and/or in addition to phone communication), the second mobile communication device 36 features a hard keyboard, a larger or higher-quality display, communications hardware and software that together implement a network communication protocol (e.g., a TCP/IP protocol stack), an implementation of a web browser 38, and a more sophisticated processor and memory that are utilized in executing the web browser 38 and rendering the provider website 40. This hardware and software often entails a higher device cost 42 for acquiring the mobile communication device 36. Moreover, the communications service provider 28 may charge additional fees for data access, which may be additional to service fees for mobile phone service. Thus, even if a user 12 wishes to acquire and use a mobile communication device 14 that is capable of presenting recommendations for providers 22 of solicited services 24, the costs of the mobile communication device 14 and the communications service may be prohibitive for cost-conscious users 12, thereby reducing participation in the recommendation service and the patronage of the providers 22 by the users 12.

Conversely, the providers 22 of such services 24 may achieve higher patronage and greater profit by promoting the acquisition and utilization of recommendation-providing mobile communication devices 14 by users 12. Providers 22 may therefore be interested in promoting the uptake of such devices by subsidizing the acquisition and service costs. For example, a provider 22 may be willing to pay the service cost 32 for a communication session 26 with the user 12 ensuing from a recommendation of the provider 22 for the solicited service 24; and a group of such providers 22 may together contribute a subsidy to reduce the costs of mobile communication devices 14 that are capable of recommending such providers 22 in response to user queries 16 submitted by the users 12 of such devices. As a result, the user 12 may receive a better mobile communication device 14 at a reduced cost, and may freely or more cheaply access the recommendation service; the communications service provider 28 may benefit by offering more sophisticated equipment and additional services to its users 12 at more affordable rates; and the providers 22 may benefit from greater patronage of services 24 resulting from the recommendations to the users 12.

Figure 2:
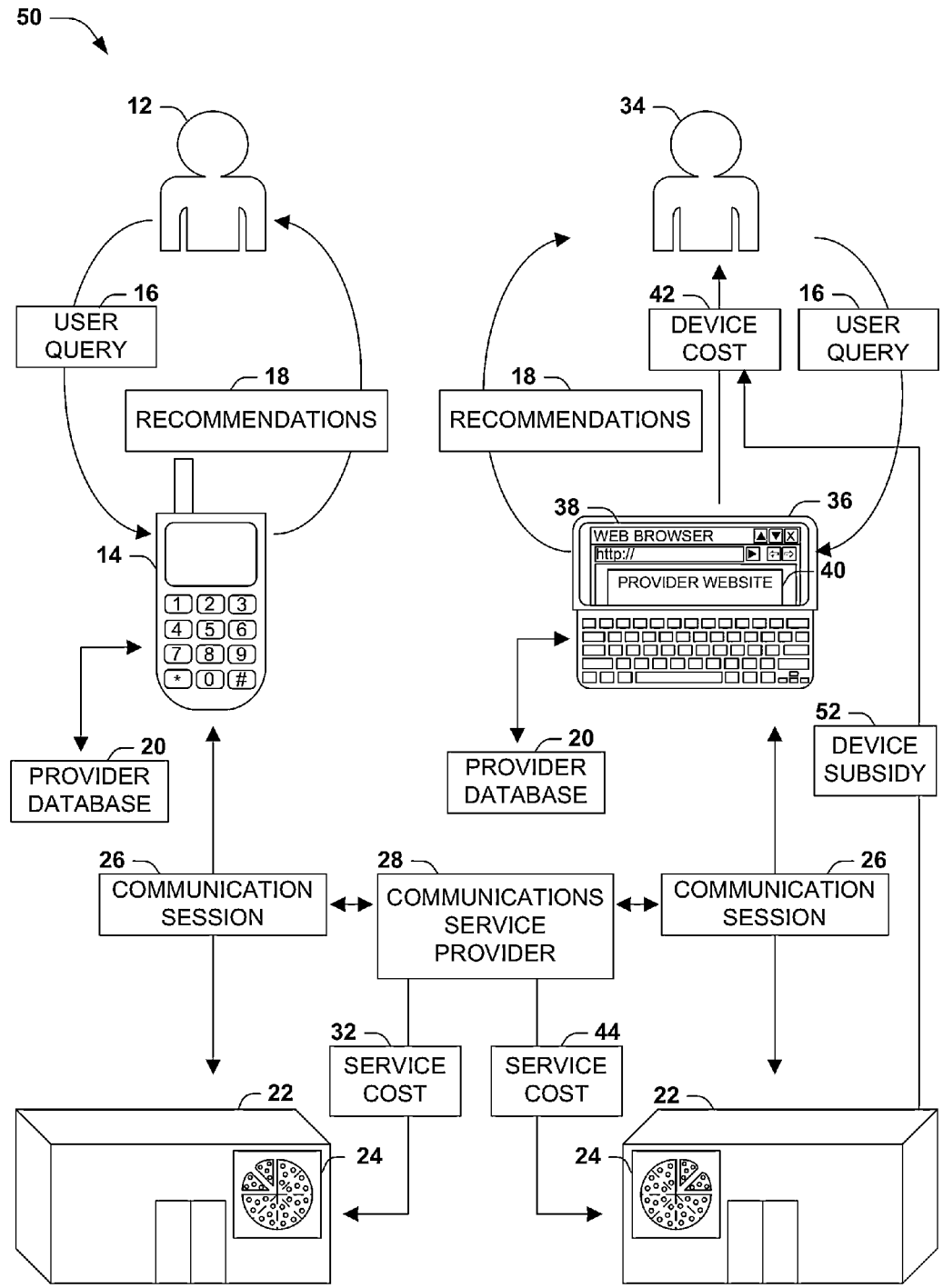
FIG. 2 is another illustration of an exemplary scenario featuring a connection of users with providers of a solicited service through mobile communication devices.

FIG. 2 illustrates a second exemplary scenario 50 featuring the recommendation of providers 22 of a solicited service 24 to users 12 in a manner that distributes the costs in a manner that facilitates user participation through the acquisition and utilization of accordingly configured mobile communication devices 14. In this exemplary scenario 50, a user 12 may again submit a user query 16 for a solicited service 24 to the mobile communication device 14, which may search a provider database 20 and may provide recommendations 18 for various providers 22 of the service 24. The user 12 may then select a provider 22, and the mobile communication device 14 may initiate the communication session 26 (e.g., a telephone call) between the user 12 and the provider 22 through the communications service provider 28. However, instead of deducting a service cost 32 from a metered data plan of the user 12, the communications service provider 28 may charge the service cost 32 to the provider 22 of the service 24, with reduced or no penalty to the metered data plan of the user 12. This redirection of the charge for the communication session 26 may promote the user 12 in utilizing the recommendation service and patronizing the provider 22. Alternatively or additionally, the second user 34 may acquire the second mobile communication device 36 having more sophisticated hardware and software in order to utilize the recommendation services and to communicate with recommended providers 22 of solicited services 24 through the web browser 38. In order to promote this arrangement, the provider 22 may provide a device subsidy 54 to offset the device cost 42 to the second user 34, therefore encouraging or enabling cost-conscious users to acquire the more sophisticated mobile communication device 36 at an affordable price. As a subsidizer of this mobile communication device 36, the provider 22 may then benefit by being included in the provider database 20 accessible through the device, and may therefore achieve greater patronage of its services 24. In this manner, the subsidization of the device costs 42 to users 12 and the redirection of the service charge for the communication session 26 with the provider 22 may reduce the participation costs of the recommendation system to the user 12, thereby promoting uptake and utilization. In one such example, the mobile communication device 36 may not have a separate data plan, thereby entailing no service charges to the user 12, but if the providers 22 cover the full service costs 32, the user 12 may nevertheless be able to communicate with providers 22 of solicited services 24 at no cost.

Figure 3:
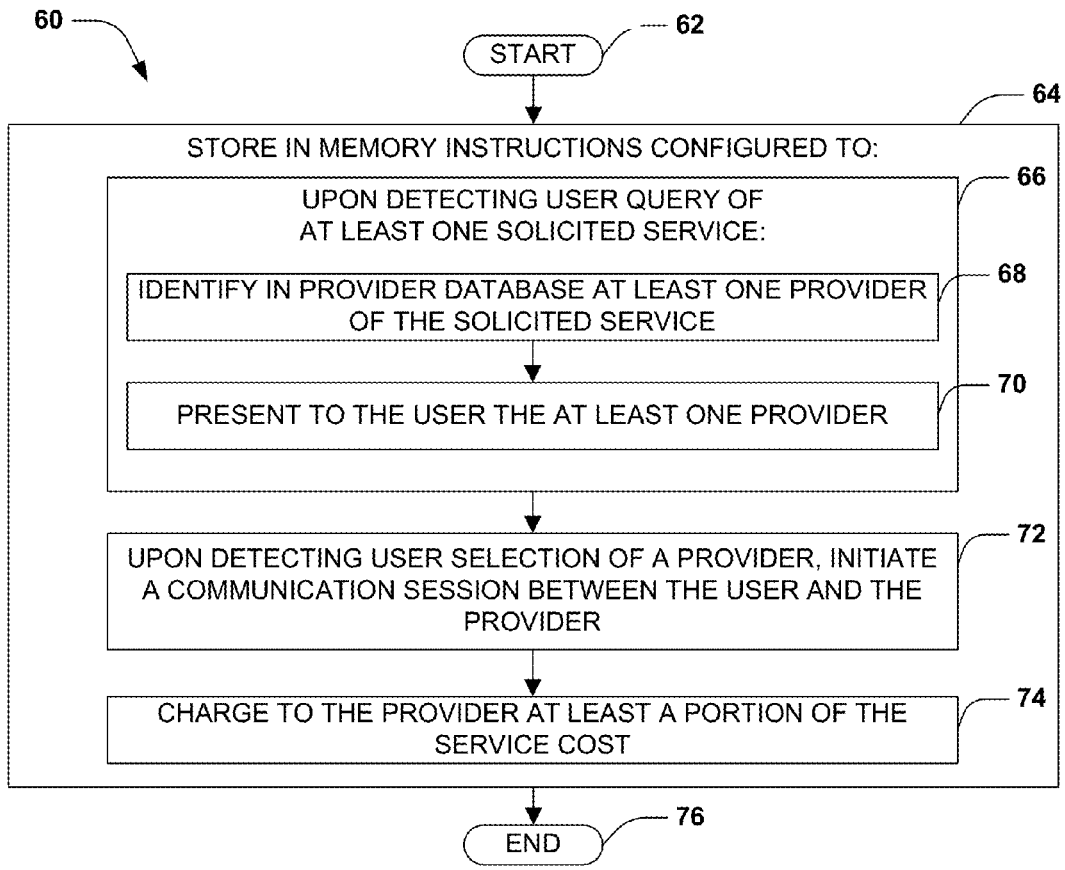
FIG. 3 is a flow chart illustrating an exemplary method of connecting a user of a mobile communication device with at least one provider of a service solicited by the user.

FIG. 3 presents an illustration of a first exemplary embodiment of these techniques as an exemplary method 60 of connecting a user 12 of a mobile communication device 14 with at least one provider 22 of a service 24 solicited by the user 12. The mobile communication device 14 referred to in this exemplary method 60 may comprise a processor, may have access to a provider database 20 (e.g., a locally stored provider database, and/or a remotely stored provider database with which the mobile communication device 14 may interact.) The mobile communication device 14 is also coupled with a service charge, such as may be assessed by a communications service provider 28 upon establishing a communication session 26 between the user 12 and another (mobile or stationary) communication device. The exemplary method 60 begins at 62 and involves executing 64, on the processor, instructions configured to implement the techniques discussed herein. More specifically, the exemplary method 60 involves, upon detecting 66 a user query 16 of at least one solicited service 22, identifying 68 in the provider database 20 at least one provider 22 offering the solicited service 24, and presenting 70 to the user 12 the at least one provider 22. The exemplary method 60 also involves, upon detecting a user selection of a provider 22, initiating 72 a communication session 26 between the user 12 and the provider 22. Finally, the exemplary method 60 involves charging 74 to the at least one provider 22 at least a portion of the service cost 32. Having connected the user 12 to a provider 22 of the solicited service 24 while shifting at least part of the service cost 32 to the provider 22, the exemplary method thereby achieves an improved cost structure of the recommendation service that benefits the user 12, the provider 22, and the communications service provider 28, and so ends at 76.

Figure 4:
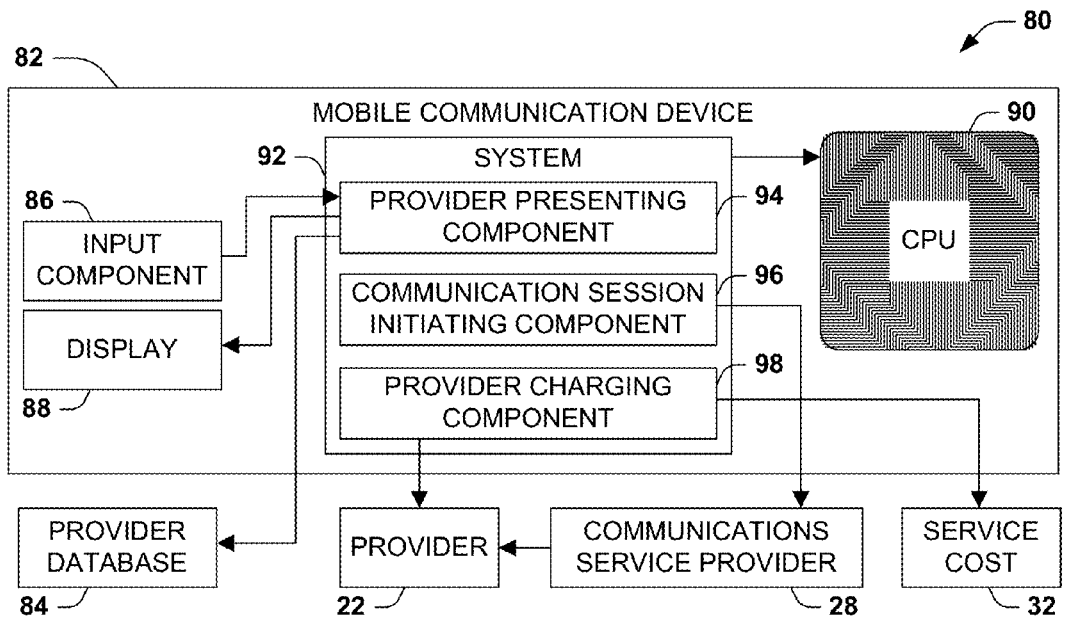
FIG. 4 is a component block diagram illustrating an exemplary system for connecting a user of a mobile communication device with at least one provider of a service solicited by the user.

FIG. 4 presents another illustration of the techniques discussed herein as an exemplary scenario 80 featuring an exemplary system 92 interfacing with a mobile communication device 82 and configured to connect a user 12 of the mobile communication device 82 with at least one provider 22 of a service 24 solicited by the user 12. The mobile communication device 82 in this exemplary scenario 80 features an input component 86, which may be operated by the user 12 to submit a user query 16, and a display 88, which may be operated by the mobile communication device 82 to present to the user 12 a set of recommendations 18 of providers 22 of a solicited service 24. The mobile communication device 82 also features a processor 90, which may execute instructions that implement part or all of the exemplary system 92. The mobile communication device 82 also has access to a provider database 84 (which may, e.g., be stored locally within the mobile communication device 82 and/or may be stored remotely in a database with which the mobile communication device 82 may interact), and may initiate communication sessions 26 via a communication service provider 28, which may assess a service cost 32 in relation to the communication service. Within this exemplary mobile communication device 82, the exemplary system 92 of FIG. 4 comprises a provider presenting component 94, which may configured to, upon detecting a user query 16 (e.g., received through the input component 86) of at least one solicited service 24, identify in the provider database 20 at least one provider 22 offering the solicited service 24, and to present to the user 12 (e.g., on the display 88) the at least one provider 22. The exemplary system 92 also comprises a communication session initiating component 96, which may be configured to, upon detecting (e.g., through the input component 86) a user selection of a provider 22, initiate a communication session 26 between the user 12 and the provider 22. Finally, the exemplary system 92 may comprise a provider charging component 98, which may be configured to charge to the at least one provider 22 at least a portion of the service cost 32. The exemplary system 92 may therefore operate within the mobile communication device 82 to facilitate the user 12 in identifying and contacting providers 22 of a solicited service 24, while also redirecting at least a portion of the costs thereof to the providers 22 in order to promote user participation in the recommendation system.

Figure 5:
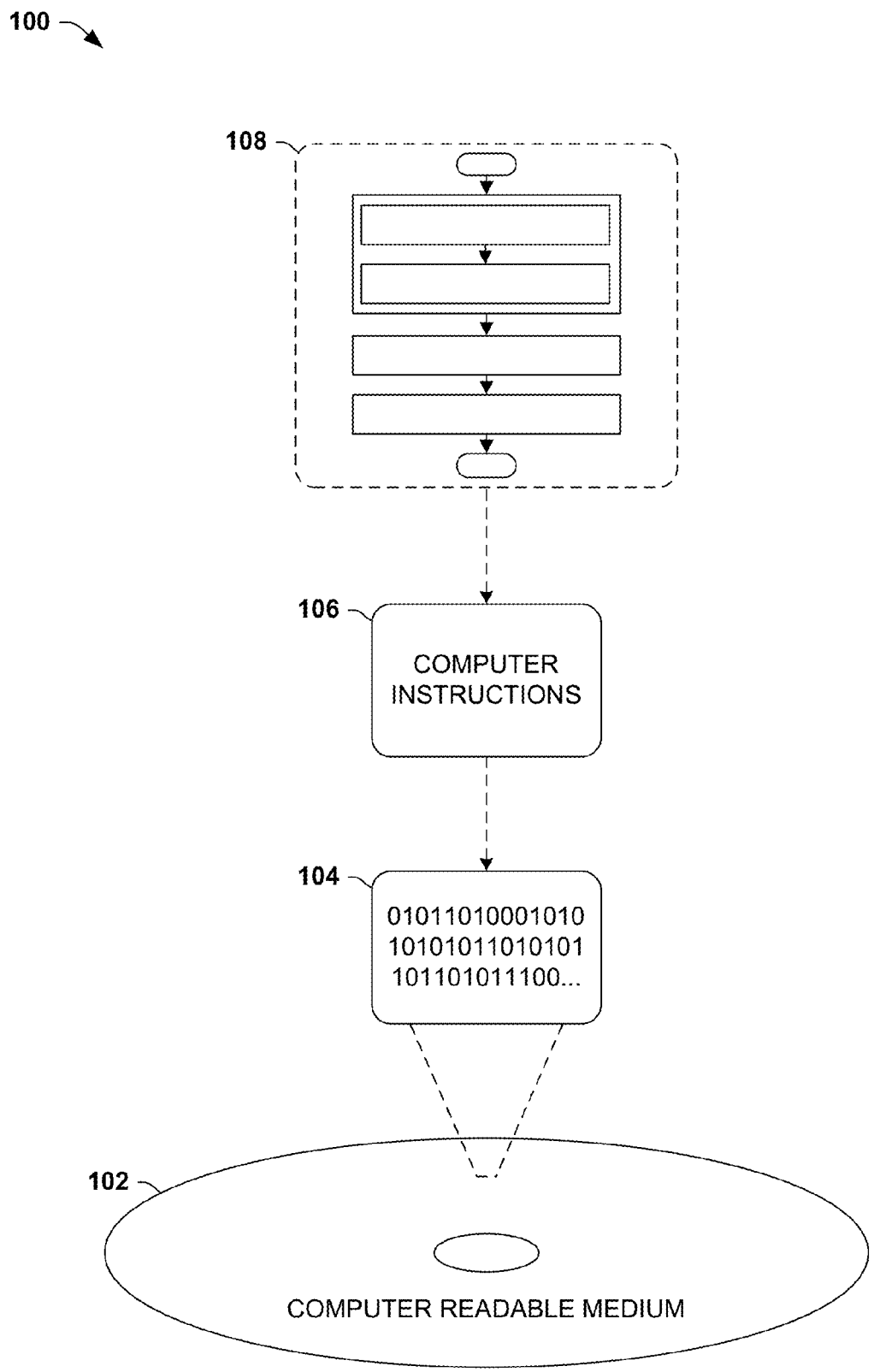
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of connecting a user of a mobile communication device with at least one provider of a service solicited by the user, such as the exemplary method 60 of FIG. 3. In another such embodiment, the processor-executable instructions 106 may be configured to implement a system for connecting a user of a mobile communication device with at least one provider of a service solicited by the user, such as the exemplary system 92 of FIG. 4. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 3 and the exemplary system 92 of FIG. 4) to confer individual and/or synergistic advantages upon such embodiments.

A first aspect that may vary among embodiments of these techniques relates to the scenarios within which such techniques are implemented. As a first variation of this first aspect, many types of mobile communication devices 14 may be capable of establishing many forms of communication sessions 26 with which these techniques may interface. A mobile cellphone device or two-way radio device may be advantageous for establishing voice-based communications with various providers 22. A mobile camera device may provide a visual and/or audiovisual communication session with such providers 22. Various text-based mobile communication devices 12 may establish various types of textual communication sessions 26 with providers, such as via SMS message, instant message or other form of textual chat, or email communication. A mobile network communications device, such as a mobile device featuring a web browser, may establish interactive communication sessions 26 with various automated services offered by a provider 22, such as a website hosted by a webserver on behalf of the provider 22. Other types of communication sessions, or combinations thereof, may also be initiated and established by such mobile communication devices 14.

As a second variation of this first aspect, these techniques may be utilized with mobile communication devices 14 having many types of architectures. As a first example, the mobile communication device 14 may comprise many types of input components 86 through which a user query 16 may be received, e.g., a text entry component such as a hardware keyboard, a touchscreen component (which may be associated with a software keyboard), or a handwriting or voice recognition component capable of parsing written or spoken user queries 16. As a second example, the mobile communication device 14 may comprise many types of presenting components that may be capable of presenting the recommendations 18 arising from a user query 16, e.g., a display 88 that may visually present providers 22 in a text or pictorial manner, or a speaker that may audibly present the providers 22. For example, the mobile communication device 14 may comprise a mobile phone having a display, which may be configured to present providers 22 to the user 12 by displaying the providers 22 on the display, and may initiate communication sessions comprising a call initiated to a telephone number associated with a selected provider 22.

As a third example of this second variation, the provider database 20 may be partly or wholly stored in a local database memory of the mobile communication device 14, which may be configured to store locally at least a portion of the provider database 20. For example, the provider database 20 may be wholly stored in a static or flash RAM, or an optical or magnetic disc. In this architecture, a provider presenting component 94 may be configured to identify the at least one provider 22 by searching the provider database 20 stored in the local database memory, which may enable comparatively quick searches that do not rely on communication with a remote database server. Alternatively, the mobile communication device 14 may comprise a local cache, which may store a portion of the provider database 20 that is hosted remotely (e.g., the set of providers 22 of a service 24 that were previously sent in response to a previous execution of a similar user query 16, or the set of providers 22 of various services 24 within a particular range of the location of the user 12.) The inclusion of a local cache may permit quicker and out-of-band evaluation of searches based on previously executed queries or on predicted queries. As another alternative, the provider database 20 may be stored on a remote server with which the mobile communication device 14 may be capable of interacting.

As a third variation of this first aspect, the mobile communication devices 12 many forms of communication service providers 28 may assess various forms of service costs 32 in relation to the establishment of communications services. The communication service provider 28 may offer cellular, satellite, and/or other wide-area communication services, or may offer communication services via more localized services, such as WiFi, Bluetooth, Ethernet, or fiber-optic. The service costs 32 may also be calculated in many ways, such as by duration (e.g., a limit of minutes used during communication sessions 26 per month), by data volume (e.g., a limit of data transferred during communication sessions 26, or a maximum data rate that may be utilized by the mobile communication device 14), or by cost (e.g., a prepaid communication service that permits various forms of communication at different rates while deducting such service costs from a prepaid account.) Alternatively, the communication service provider 28 may not offer general-purpose communications through the mobile communication device 14 (and may not charge any service costs 32 to the user 12), but may permit the mobile communication device 14 to initiate communication sessions 26 with the providers 22 of solicited services 24, and may accordingly charge all of the service costs 32 of such communication sessions 26 to the providers 22.

As a fourth variation of this first aspect, the relationship of the communication service provider 28 with the mobile communication device 14 may take many forms. The communication service provider 28 may have no particular relationship with or control over the mobile communication device 14; e.g., the communication service provider 28 may simply offer communication services to any compatible device presented by a user 12, and in fact may not know the type of mobile communication device 14 utilized by the user 12. Alternatively, the communication service provider 28 may provide mobile communication devices 14 to users 12, e.g., in conjunction with a service contract having a specific duration. This type of arrangement is frequently offered by communication service providers 28, who may, e.g., subsidize part or all of the acquisition cost of the mobile communication device 14 and may recoup the subsidy throughout the life of the service contract with the user 12, thereby reducing the user's initial barrier to entry into the service contract. The techniques discussed herein may be particularly useful in this context, where the subsidy of the acquisition cost of the mobile communication device 14 may be partly or wholly paid by the providers 22 of potentially solicited services 24 instead of the communication service provider 28. These techniques may also be advantageous in this context for mid-range mobile communication devices 14. It may be appreciated that low-cost mobile communication devices 14 (e.g., simple cellular phones) may feature a comparatively low per-unit price, such that the subsidization is too small to warrant the use of these techniques; and high-cost mobile communication devices 14 (e.g., full-featured smartphones and mobile computers) may be coupled with fixed-rate, unmetered data plans, such that the user 12 may not face the prospect of service costs 32 that incentivize participation in the recommendation system. Therefore, mid-range mobile communication devices 14 may be sufficiently expensive to provide an advantage to the implementation of the techniques discussed herein, while also being coupled to metered data plans that users 12 may wish to economize through participation in the recommendation service. Those of ordinary skill in the art may devise many scenarios within which these techniques may be utilized.

A second aspect that may vary among embodiments of these techniques relates to the manner of detecting the user query for one or more solicited services 24. As a first example, the user 12 may directly input a query to the mobile communication device 14, such as through an input component 86. As a second example, the user 12 may perform a user action from which a query may be inferred; e.g., while traveling on a long highway trip, the user 12 may exit at an exit ramp near a mealtime, and the mobile communication device 14 may infer that the user 12 may wish to find providers, such as restaurants, that match the food preferences of the user 12. As a third example, the mobile communication device 14 may detect a feature pertaining to the user 12, e.g., the fuel status of a vehicle operated by the user 12, and may perform a search for related services that match the preferences of the user 12, e.g., nearby fuel depots with low prices or a particularly preferred type of fuel. Those of ordinary skill in the art may devise many ways of detecting a user query pertaining to the user 12 while implementing the techniques discussed herein.

A third aspect that may vary among embodiments of these techniques relates to the manner of identifying providers 22 of solicited services 24 from the set of providers 22 in a provider database 20, which may be a comprehensive list of all known providers 22 of all known services 24. As a first example, the mobile communication device 14 may have access to a user profile, wherein the preferences of the user 12 may be stored (e.g., either specified explicitly by the user 12 or inferred from prior user actions), and upon receiving a user query 16 for a solicited service 24, the mobile communication device 14 may search the provider database 20 for providers 22 of the service 24 that match the user preferences stored in the user profile. As a second example, the mobile communication device 14 may include a location identifying device that may be used to identify a user location, and the mobile communication device 14 may search the provider database 20 for providers 22 of the service 24 that are located near the user location. The location identifying device may comprise, e.g., a geolocating device such as global positioning service (GPS) receiver that is capable of determining the user location according to the detected latitude and longitude. The mobile communication device 14 may then search the provider database 20 for providers 22 that are located near the user location. Alternatively or additionally, the location identifying device may comprise, e.g., a reference point locating component, which may be capable of identifying nearby landmarks of known locations. For example, the location identifying device may be able to identify wireless networks that are within range of the mobile communication device 14, and may be able to identify a location specified by the wireless network broadcaster. Alternatively or additionally, the location identifying component might be capable of detecting the locations of nearby cellular network towers with known and specified locations, and of triangulating the current location of the mobile communication device 14 based on the signal strengths of such cellular network towers. The mobile communication device 14 may therefore be able to identify in the provider database 20 at least one nearby provider 22 offering the solicited service 24 that is located near the nearby reference point.

Figure 6:
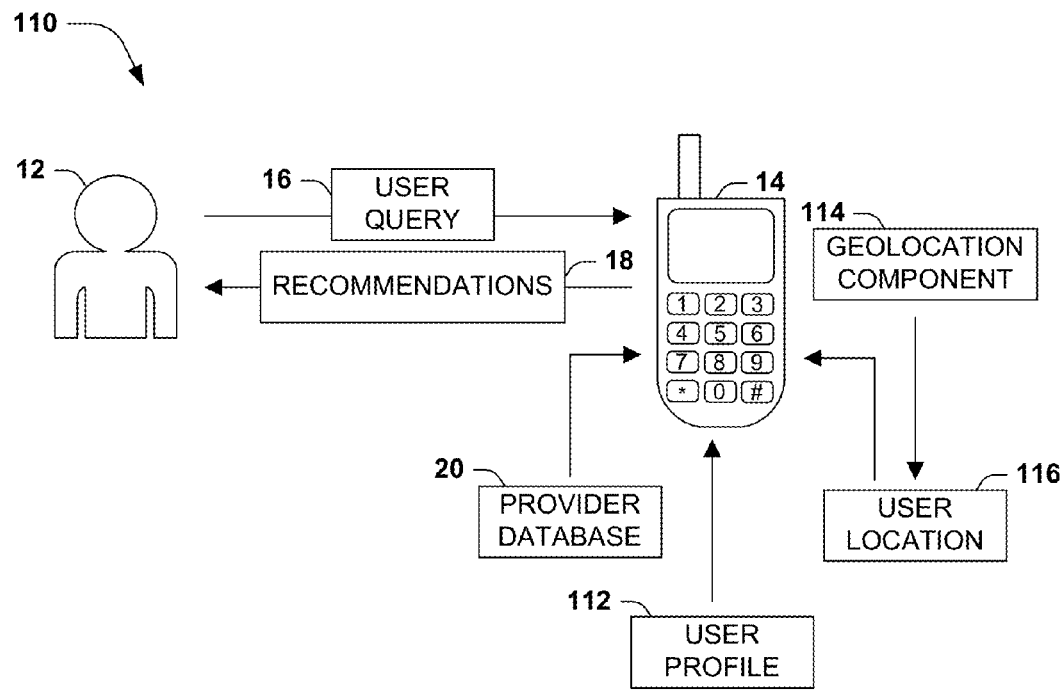
FIG. 6 is an illustration of an exemplary selection of providers by a mobile communication device from a provider database.

FIG. 6 illustrates an exemplary scenario 110 featuring a user 12 of a mobile communication device 14 configured to provide a set of recommendations 18 for providers 22 in response to a user query 16 specifying at least one solicited service 24. The mobile communication device 14 comprises a provider database 20 representing a set of providers 22 that may satisfy the user query 16. The mobile communication device 14 also comprises a user profile 112, wherein preferences of the user 12 for various providers 22 and/or services 24 may be stored and used to select preferred providers 22 from the provider database 20. The mobile communication device 14 also comprises a geolocation component 114 that is configured to detect a user location 116 of the mobile communication device 14, and may be used to identify providers 22 of the solicited services 24 that are near the user location 116. By utilizing these resources, the mobile communication device 14 may present to the user 12 a set of recommendations 18 of providers 22 that are both preferred by the user 12 according to the user profile 112 and that are located conveniently near the user location 116. Those of ordinary skill in the art may devise many techniques for selecting providers 22 of solicited services 24 from the provider database 20 while implementing the techniques discussed herein.

A fourth aspect that may vary among embodiments of these techniques relates to the manner of presenting selected providers 22 to a user 12 in response to a user query 16. As a first example, the set of recommendations 18 may simply be presented to the user 12 as a list of providers 20, and may also include, e.g., telephone numbers and addresses. As a second example, the provider database 20 may comprise advertisements of services 24 offered by varies providers 22, and the set of recommendations 18 may be presented to the user 12 as a set of advertisements of the solicited services 24 offered by the providers 22 upon retrieval from the provider database 20. As a third example, upon detecting a selection of a provider 22 by the user 12, the mobile communication device 14 may identify a user location 116, compute a route from the user location 116 to the provider 22, and present the route to the user 12, in order to facilitate the user 12 in reaching the provider 22. As a fourth example, the timing of the presentation of the set of recommendations 18 may provide additional advantages.

Figure 7:
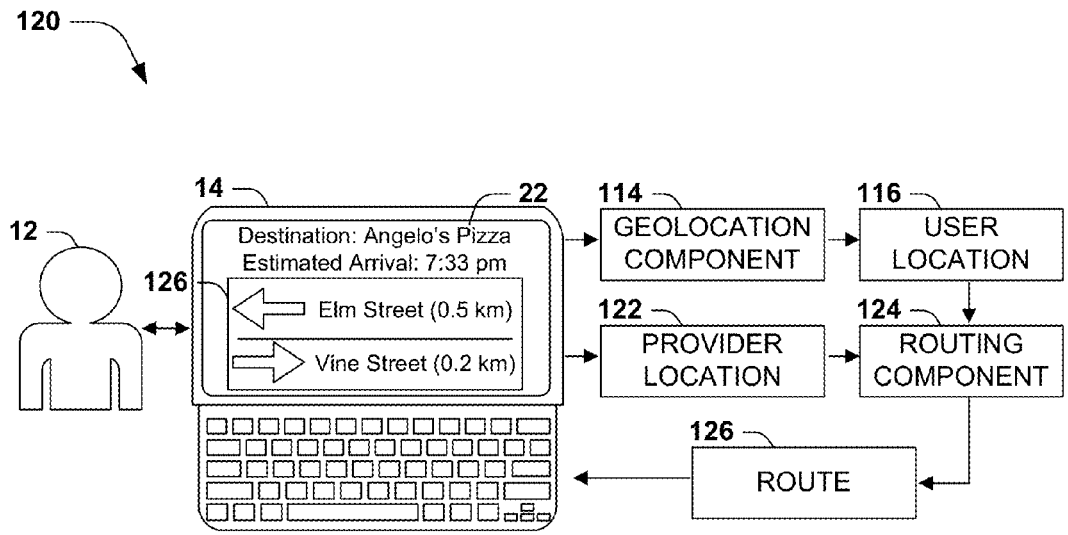
FIG. 7 is an illustration of an exemplary presentation of a selected provider to a user by a mobile communication device.

FIG. 7 presents an illustration of an exemplary scenario 120 featuring the provision of a recommendation 18 to a user 12 in response to a user query 16 for a particular restaurant. The mobile communication device 14 in this exemplary scenario 120 features a geolocation component 114, whereby a user location 116 may be detected. Upon detecting from the user 12 a selection of a provider 22 of the solicited service 24, the mobile communication device 14 may query the geolocation component 114 for the user location 116, and may compute a route from the user location 116 to the location of the selected provider 22. The mobile communication device 14 may also comprise a routing component 124, which may be configured to compute a route 126 from a first location to a second location. The mobile communication device 14 may therefore provide the user location 116 and a provider location 122 to the routing component 124, wherefrom may be computed a route 126. The mobile communication device 14 may therefore display the selected provider 22 along with the route 126, e.g., as a set of turn-by-turn directions.

In another such scenario, the user query 16 may comprise a communication session 26 initiated by the user 12 with a contacted provider 22. The mobile communication device 14 may be configured to, while initiating the communication session 26 with the contacted provider 22, present to the user 12 a set of other providers 22 of the services 24 offered by the contacted provider 22. For example, if the user 12 initiates contact with a restaurant offering a particular type of food, the mobile communication device 14 may identify the type of food offered by the contacted restaurant, and may search the provider database 20 for other restaurants offering the same type of food, but that may be more highly preferred by the user 12 (e.g., that may be nearer, more affordable, or of higher quality.) Moreover, the set of recommendations 18 may be presented while the user 12 during the initiation of the communication session 26 with the called provider 22. If the user 12 then selects one of the other providers 22, the mobile communication component may terminate the communication session 26 with the contacted provider 22 and may initiate a new communication session 26 between the user 12 and the selected provider 22. In this manner, the mobile communication device 14 may promote the recommendation to the user 12 of more preferable providers 22 of a solicited service 24 in a timely manner and at a pertinent moment, when the attention of the user 12 may be available and focused on selecting a provider 22 of the solicited service 24. Those of ordinary skill in the art may devise many techniques for presenting recommendations of providers 22 of one or more solicited services 24 to a user 12 while implementing the techniques discussed herein.

A fifth aspect that may vary among embodiments of these techniques relates to the manner of calculating the service cost 32 to be charged to the at least one provider 22. In some embodiments of these techniques, the service cost 32 may be based on the establishment of the communication session 26 by the communication service provider 28 between the provider 22 and the user 12. However, in other embodiments of these techniques, additional service costs 32 maybe chargeable to at least one provider 22 based on additional services that may be performed by the communication session provider 28 on behalf of one or more providers 22.

As a first example of this fifth aspect, the communication session provider 28 may provide many types of additional services on behalf of the one or more providers 22. As a first variation, the communication session provider 28 may advertise a provider 22, e.g., by presenting an advertisement generated by the provider 22, or by promoting the advertiser 22 within the search results generated in response to the user query 16. As a second variation, after the user 12 selects a particular provider 22, the communication session provider 28 may facilitate the patronizing of the provider 22, e.g., by displaying directions from the current location of the user 12 to the provider 22, or by adding the provider 22 to a route currently followed by the user 12.

As a second example of this fifth aspect, with respect to various additional services that maybe provided by the communication session provider 28 on behalf of one or more providers 22, the communication session provider 28 and a provider 22 may agree upon the service costs 32 of such services in various ways. As a first variation, the communication session provider 28 may establish a set of rates for various additional services (e.g., an advertising rate for presenting an advertisement and a routing rate for adding the location of a provider 22 to a route of a user 12) that one or more providers 22 may accept. The communication session provider 28 may then provide such additional services to various users 12 on behalf of the providers 22 who have accepted the established rates, and may charge such providers 22 (included in a service charge 32) upon providing the additional service to a user 12. As a second variation, one or more providers 22 may solicit various additional services at particular rates, and the communication session provider 28 may accept such solicitations by providing the solicited service(s) to one or more users 12 and by including the advertised rates in the service charges 32 assessed to such providers 22. In one such embodiment, the communication session provider 28 may even endeavor to achieve a revenue stream from such providers 22 by offering many solicited services, and might even select among a combination of such solicited services that achieves a desirably high revenue stream (e.g., in response to a user query 16 of a particular service, search results may be presented by selecting corresponding providers 22, and may be ordered based on the rate offered by each provider 22 for inclusion in the search results.) In another such variation, the services may be performed only under certain conditions (e.g., presenting an advertisement or recommendation 18 of a provider 22 only if the user 12 is within a convenient distance of the provider 22), and/or may condition payment of service costs 32 for such services upon various conditions (e.g., a higher service cost 32 may be payable by the provider 22 if the user 12 is closer to the provider 22 at the time of a recommendation 18, such that the user 12 may be more likely to patronize the provider 22 in response to the recommendation 18.)

Figure 8:
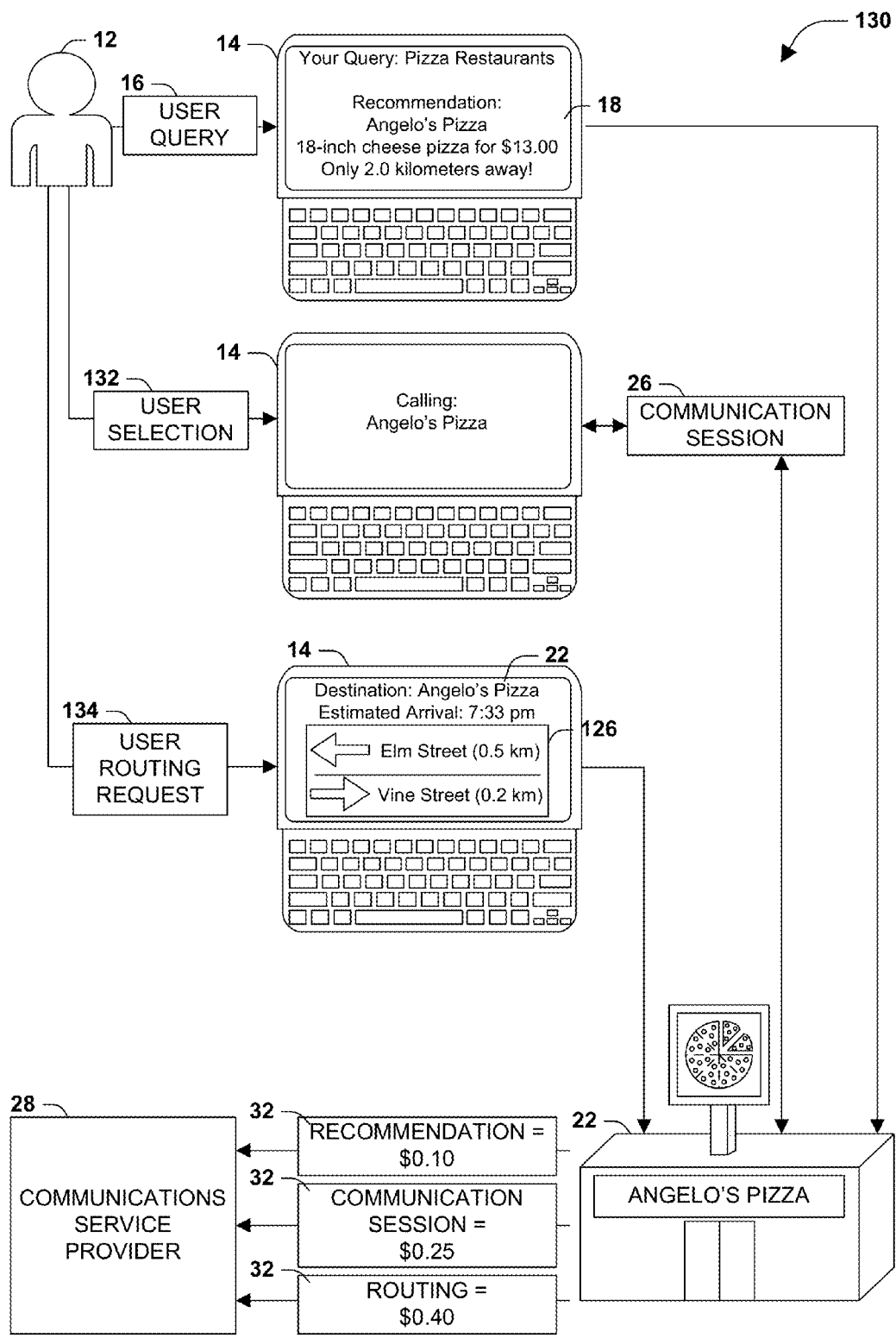
FIG. 8 illustrates an exemplary scenario featuring the provision of various additional services to a user of a mobile communication device on behalf of a provider.

FIG. 8 illustrates an exemplary scenario 130 featuring a communication session provider 28 that provides a set of additional services to a user 12 of a mobile communication device 14 on behalf of a provider 22 comprising a pizza restaurant. In this exemplary scenario 130, the provider 22 and the communication session provider 28 may negotiate (either at an earlier time point, or on an ad hoc basis) an agreement for the communication service provider 28 to provide various services to the user 12 on behalf of the provider 22, and for the provider 22 to pay the communication service provider 28 a particular rate upon performance of the respective services. As a first example, when the user 12 submits a user query 16 to the mobile communication device 14 (e.g., for nearby restaurants serving pizza), the mobile communication device 14 may provide a set of recommendations 18, including the provider 22. Upon providing this recommendation 18 of the provider 22, the mobile communication device 14 may notify the provider 22 and/or the communication service provider 28, and a first service cost 32 may be paid to the communication service provider 28 in exchange for providing the recommendation 18 to the user 12. Moreover, the mobile communication device 14 may be configured to present this recommendation 18 with priority (e.g., with greater emphasis, higher in the list of recommendations 18, or exclusively selected) over the recommendations 18 of other providers 22 (e.g., where such other providers 22 have offered to pay smaller service costs 32 or no service costs 32 for such recommendations 18.) The user 12 may accept the recommendation 18, and may next request the mobile communication device 14 to establish a communication session 26 with the provider 22. The mobile communication device 14 may therefore establish the communication session 26 between the user 12 and the provider 22, and in exchange, the provider 22 may pay a second service cost 32 to the communication session provider 28. The user 12 may also request form the mobile communication device 14 to compute and display a route 16 from the current location of the user 12 to the provider 22, and in exchange, the provider 22 may pay a third service cost 32 to the communication session provider 28. In this manner, the communication session provider 28 may configure the mobile communication device 14 to perform various additional services (supplemental to establishing the communication session 26) on behalf of the provider 22, and may achieve a revenue stream from the provider 22 in exchange for the provision of such services. Those of ordinary skill in the art may devise many techniques for establishing service costs 32 for additional services performed by the mobile communication device 14 on behalf of the provider 22 while implementing the techniques discussed herein.

A sixth aspect that may vary among embodiments of these techniques relates to the manner of charging at least a portion of the service cost 32 (once calculated as per the fifth aspect discussed herein) to the at least one provider 22. In these embodiments of the techniques discussed herein, the providers 22 of the various services 24 may cover part or all of the service cost 32 to the communication service provider 28 of providing the communication session 26. This coverage may enable the user 12 to partake of the recommendation service at a reduced or no cost, while also promoting the patronage of the services 24 of the providers 22.

As a first example, the mobile communication device 14 may be coupled with a metered data plan of the user 12. Ordinarily, when the user 12 initiates a communication session 26 with a party, the communication service provider 28 may assess the service cost 32 by deducting the usage of the communication session 26 from the metered data plan of the user 12. However, when a communication session 26 is initiated between the user 12 and a provider 22 of a solicited service 24, where the provider 22 has been recommended to the user 12 in a set of recommendations 18 in response to a user query 16, the mobile communication device 14 may initiate the communication session 26 outside of the metered data plan. In this manner, the user 12 may not be billed for utilizing the recommendation service. Moreover, in a further embodiment, the communications service provider 28 may charge to the provider 22 at least a portion of the service cost 32 of the communication session 26 initiated between the user 12 and the provider 22. In this manner, the provider 22 may cover the cost of the communication session 26 with the user 12 arising from the recommendation by the mobile communication device 14, while the user 12 may not be charged. In a further embodiment, the mobile communication device 14 may not even have a general-purpose data plan, and the user 12 may be able to use the mobile communication device free of service costs 32 to utilize solicited services 24 of recommended providers 22.

As a second example, the mobile communication device 14 may compile and charge to respective providers 22 a set of per-instance service costs 32 related to various recommendation services provided by the mobile communication device 14 on behalf of the provider 22. In these embodiments, the retailer of the mobile communication device 14 and/or the communication service provider 28 may negotiate with providers 22 to establish a per-activity service cost 32 that is to be paid by the provider 22 in exchange for promoting the patronage of the provider 22 by various users 12. In a first such embodiment, the mobile communication device 14 may charge a service cost 32 to a provider 22 upon storing a representation of the provider 22 in the provider database 20, such as when a representation of the provider 22 is first created, or when the representation of the provider 22 is updated or maintained. In a second such embodiment, the mobile communication device 14 may charge a service cost 32 to a provider 22 upon presenting the provider 22 to the user 12 in response to the user query 16, e.g., within a set of recommendations 18 of providers 22 of the solicited services 24. This arrangement may resemble a "per-impression" advertising payment relationship that is often developed for online advertisements. In a third such embodiment, the mobile communication device 14 may charge a service cost 32 to a provider 22 upon initiating the communication session 26 between the user 12 and the provider 22. This arrangement may resemble a "click-through" advertising payment relationship, wherein the provider 22 is charged for user actions that indicate an interest of the user 12 in partaking of the services 24 of the provider 22. In a further such embodiment, the service cost 32 may be computed proportionally to the duration of the communication session 26 between the user 12 and the provider 22. This computation may be helpful, e.g., for charging a provider 22 more for communication sessions 26 that are likely to have resulted in a sale of a service 24, and/or for encouraging providers 22 to handle solicitations by users 12 promptly, thereby improving the user experience with the recommendation service. Those of ordinary skill in the art may devise many techniques for computing and charging service costs 32 to providers 22 in exchange for inclusion in the recommendation service while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
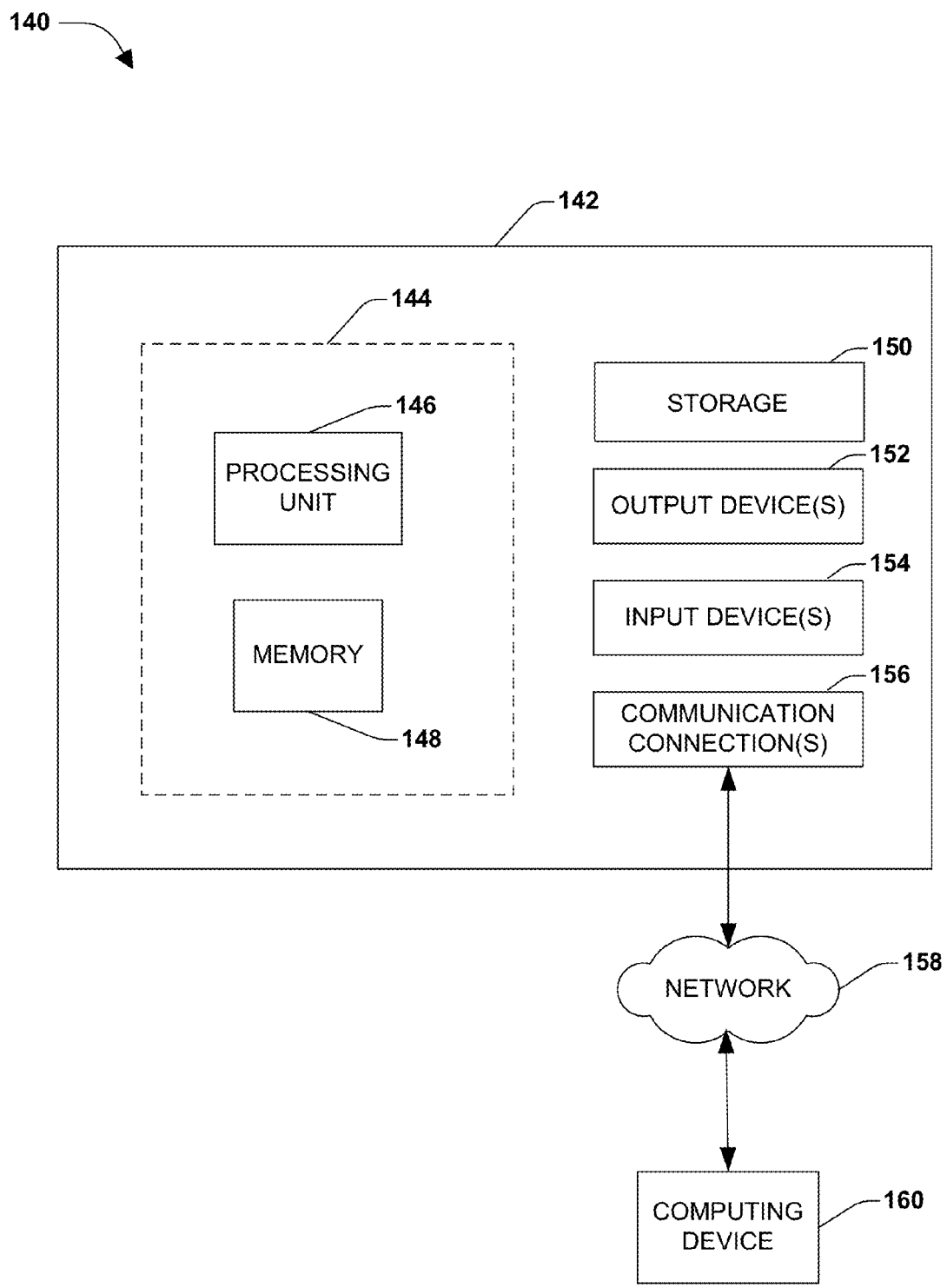
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 9 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 9 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of connecting a user of a mobile communication device with at least one provider of a service solicited by the user, the mobile communication device having a processor and access to a provider database identifying, for respective providers, at least one service provided by the provider, the mobile communication device coupled with a service cost, the method comprising:

executing on the processor instructions configured to:
  upon detecting a user query of at least one solicited service:
    identify in the provider database at least one provider offering the solicited service, and
    present to the user the at least one provider;
  upon detecting a user selection of a selected provider, present to the user an option to initiate a communication session between the user and the selected provider; and
  upon detecting a communication session between the user and the selected provider, charge to the selected provider of the solicited service at least a portion of the service cost.

2. The method of claim 1:
the mobile communication device comprising a mobile phone having a display;
presenting the providers to the user comprising: displaying the providers on the display; and
the communication session comprising a call initiated to a telephone number associated with the provider.

3. The method of claim 1, identifying the at least one provider comprising:
identifying a user location, and
searching the provider database for providers near the user location offering the solicited service.

4. The method of claim 3:
the mobile communication device comprising a geolocation component, and
identifying the at least one provider comprising:
  querying the geolocation component to identify a user location, and
  identifying in the provider database at least one nearby provider offering the solicited service and near the user location.

5. The method of claim 3:
the mobile communication device comprising a reference point locating component, and
identifying the at least one provider comprising:
  querying the reference point locating component to identify at least one nearby reference point, and
  identifying in the provider database at least one nearby provider offering the solicited service and near the nearby reference point.

6. The method of claim 1:
the provider database comprising at least one advertisement of a service offered by a provider; and
presenting the providers to the user comprising: presenting to the user the advertisement of the provider for the solicited service.

7. The method of claim 1, the instructions further configured to, upon detecting the user selection of the at least one provider:
identify a user location;
compute a route from the user location to the provider; and
present the route to the user.

8. The method of claim 1:
the user query comprising a communication session initiated with the selected provider;
presenting providers comprising: presenting providers to the user while initiating the communication session with the selected provider; and
the instructions further configured to, upon detecting a user selection of a second selected provider other than the selected provider:
  terminate the communication session with the selected provider, and initiate a communication session between the user and the second selected provider.

9. The method of claim 1:
the mobile communication device coupled with a metered data plan of the user, and
initiating the communication session comprising: initiating a communication session between the user and the provider, the communication session initiated outside of the metered data plan.

10. The method of claim 9:
the metered data plan provided by a communications service provider, and
initiating the communication session outside of the metered data plan comprising:
charging to the user the service cost associated with communication sessions initiated between the user and parties other than the provider; and
charging to the provider at least a portion of the service cost associated with communication sessions initiated between the user and the provider.

11. The method of claim 1, charging the at least one provider comprising: charging a service cost to the at least one provider upon storing a representation of the provider in the provider database.

12. The method of claim 1, charging the at least one provider comprising: charging a service cost to the at least one provider in response to, upon detecting the user query, presenting to the user the provider.

13. The method of claim 1, charging the at least one provider comprising: charging a service cost to the at least one provider upon initiating the communication session between the user and the provider.

14. The method of claim 13, charging the at least one provider comprising: charging a service cost to the at least one provider that is proportional to a duration of the communication session between the user and the provider.

15. The method of claim 1:
the instructions further configured to perform on the mobile communication device at least one additional service on behalf of the provider; and
charging the at least one provider comprising: charging a service cost to the at least one provider in exchange for performing the at least one additional service on behalf of the provider.

16. A computer-readable memory device comprising a system interfacing with a mobile communication device having access to a provider database identifying, for respective providers, at least one service provided by the provider, the mobile communication device coupled with a service cost, the system configured to connect a user of the mobile communication device with at least one provider of a service solicited by the user, the system comprising:
a provider presenting component configured to, upon detecting a user query of at least one solicited service:
identify in the provider database at least one provider offering the solicited service, and
present to the user the at least one provider;
a communication session initiating component configured to, upon detecting a user selection of a selected provider, present to the user an option to initiate a communication session between the user and the selected provider; and
a provider charging component configured to, upon detecting a communication session between the user and the selected provider, charge to the selected provider of the solicited service at least a portion of the service cost.

17. The computer-readable memory device of claim 16:
the mobile communication device comprising a geolocation component, and
the provider presenting component configured to:
query the geolocation component to identify a user location, and
identify in the provider database at least one nearby provider offering the solicited service and near the user location.

18. The computer-readable memory device of claim 17:
the mobile communication device comprising a routing component, and
the communication session initiating component configured to, upon detecting a user selection of at least one nearby provider:
compute a route from the user location detected by the global positioning service component to the nearby provider, and
present the route to the user.

19. The computer-readable memory device of claim 15:
the communication session initiating component further configured to perform on the mobile communication device at least one additional service on behalf of the selected provider; and
the provider charging component further configured to charge the service cost to the selected provider in exchange for performing the at least one additional service on behalf of the selected provider.

20. A computer-readable storage medium comprising instructions that, when executed on a processor of a mobile communication device comprising a mobile phone having coupled a metered data plan and having a display, a geolocation component, and access to a provider database comprising at least one advertisement of at least one service offered by at least one provider, connect a user of the mobile communication device with at least one provider of a service solicited by the user by:
for respective providers, identifying at least one service provided by the provider;
upon detecting a user query of at least one solicited service:
querying the geolocation component to identify a user location,
searching the provider database for nearby providers near the user location offering the solicited service and near the user location, and
presenting to the user on the display the at least one advertisement of the solicited service offered by the at least one nearby provider;
upon detecting a user selection of a provider:
initiating a communication session comprising a call initiated to a telephone number of the provider outside of the metered data plan,
compute a route from the user location to the provider, and
present the route to the user; and
upon detecting a communication session between the user and a contacted provider, charging at least a portion of the metered data plan to the at least one provider that is proportional to a duration of the communication session between the user and the provider.

* * * * *